Dec. 23, 1941.  L. AMBROSE  2,266,728
BRAKE
Filed April 3, 1939  4 Sheets-Sheet 1

LOUIS AMBROSE.
INVENTOR.
BY Herbert J. Smith
ATTORNEY.

Dec. 23, 1941.  L. AMBROSE  2,266,728
BRAKE
Filed April 3, 1939  4 Sheets-Sheet 2
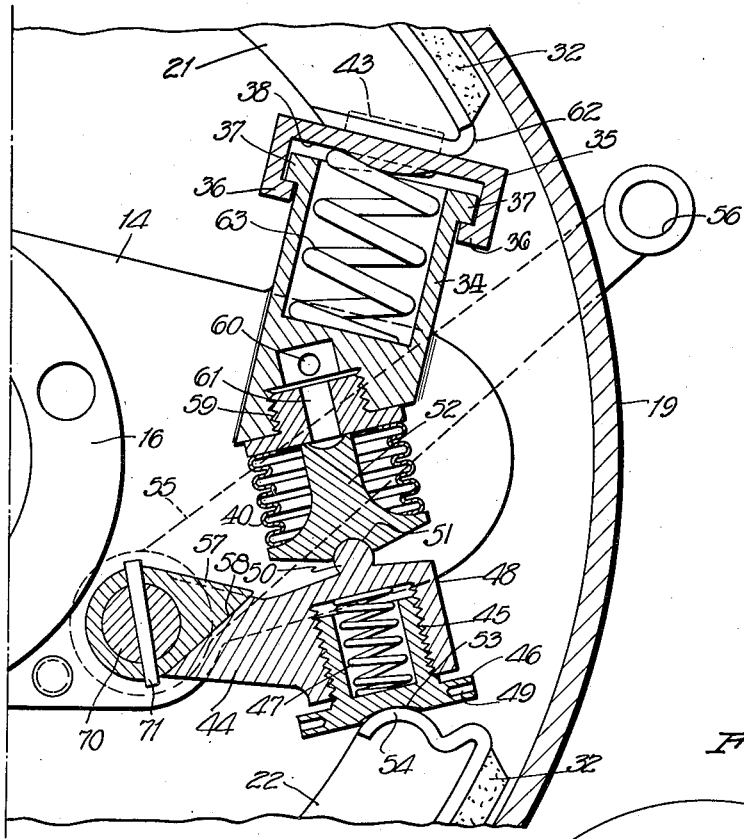
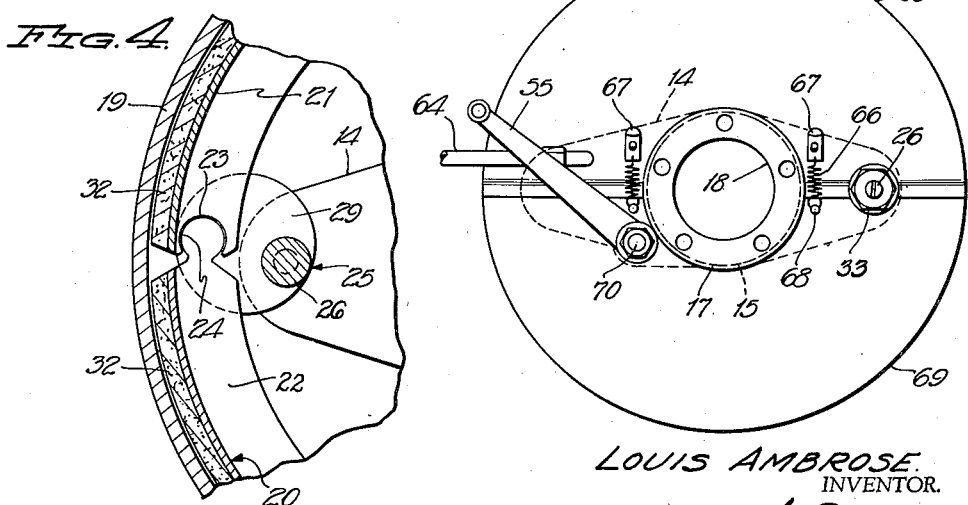
LOUIS AMBROSE
INVENTOR.
BY Herbert J. Smith
ATTORNEY.

Dec. 23, 1941.   L. AMBROSE   2,266,728
BRAKE
Filed April 3, 1939   4 Sheets-Sheet 3

LOUIS AMBROSE.
INVENTOR.

BY *Herbert J. Smith*
ATTORNEY.

Dec. 23, 1941.  L. AMBROSE  2,266,728
BRAKE
Filed April 3, 1939   4 Sheets-Sheet 4
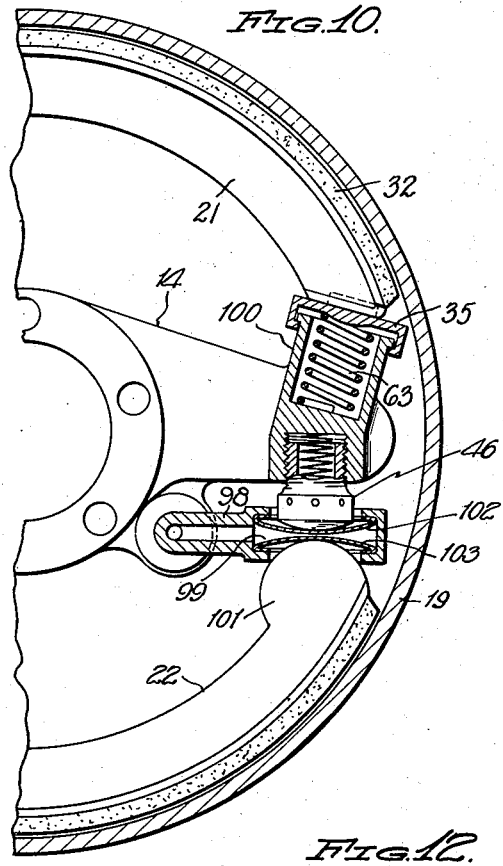
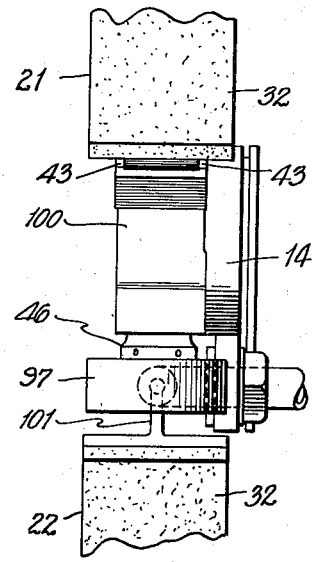
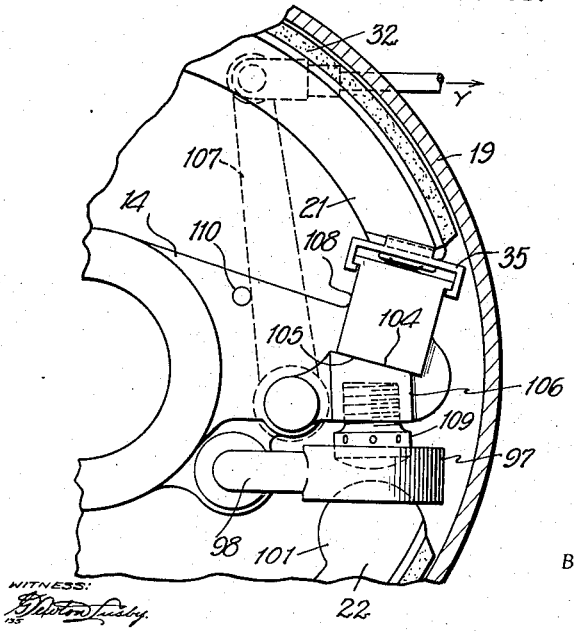
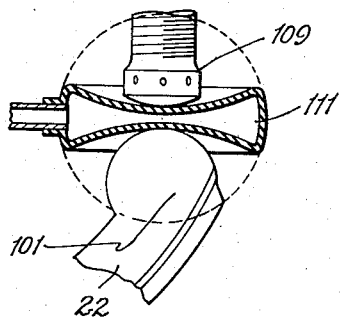
LOUIS AMBROSE
INVENTOR.
BY Herbert J Smith
ATTORNEY.

Patented Dec. 23, 1941

2,266,728

UNITED STATES PATENT OFFICE 2,266,728

BRAKE

Louis Ambrose, New York, N. Y., assignor, by direct and mesne assignments, of one-third to Aldo M. Franchi, New York, one-third to John J. Seroska, Woodside, Long Island, and one-third to Anthony V. Stone, Jackson Heights, N. Y.

Application April 3, 1939, Serial No. 265,824

2 Claims. (Cl. 188—152)

This invention pertains to brakes and in particular to a classification of brakes wherein the entire brake band engages the inner surface of the drum by applying force in a single direction and which brake is non-locking until after a pre-determined amount of force has been applied thereto to overcome a resilient means intermediate the ends of the complemental brake shoes.

Heretofore, it has been the practice to utilize a brake which was so constructed that when the force was applied to move the brake band against the drum there was little, if any, resiliency permitted once the brake band engaged the drum. The resiliency ordinarily afforded depended largely on the operating fit of the rigid mechanical parts or possibly on the compressibility of fluids in the fluid type of brake operator which, for example, may be oil. The compressibility of fluids is very slight, if any, and in most cases can be considered negligible since the resiliency dependent on fluid alone was insufficient to afford a desirable degree of nicety in brake application.

The present invention affords a full-floating brake which is non-locking until after an amount of force is applied, which force is usually of such a degree that under normal operation, depending on the type of vehicle on which the brake is used, the wheels or traction part will not skid. This is advantageous since it is realized that once the moving part, such as the wheel of the vehicle skids, the effectiveness of the brake is lost since the rotating part, once it is locked constitutes a skid rather than a restrained revolving member.

It is an object of this invention to provide a resilient brake which is non-locking until after a pre-determined amount of force has been applied, which force is slightly less than that required to cause a rotating member, such as a wheel, to skid.

A further object is to provide a brake which utilizes force applied to one end of the brake shoe, the opposing end of the brake shoe being substantially laterally slidable.

A further object of the invention is to provide a pair of hinged brake shoes which utilize a resilient means to retard brake locking.

A still further object is to provide a full-floating non-locking brake.

Further and other objects may be and may become apparent to those skilled in the art from a perusal of the following specification and the subjoined claims.

In the drawings:

Fig. 1 represents a side view partially in section showing the general layout of the various parts.

Fig. 2 is a view partially in section taken substantially along line 2—2 of Fig. 1.

Fig. 3 is an enlarged sectionalized side view taken substantially on lines 3—3 of Fig. 2.

Fig. 4 is an enlarged sectionalized side view taken substantially on lines 4—4 of Fig. 2.

Fig. 5 is a side view of mechanical and fluid connections to apply operating force to the brake.

Fig. 10 is a side view partially in section representing a method of applying fluid braking force.

Fig. 11 is a side elevation as viewed from the right in Fig. 10 with the brake drum broken away or removed.

Fig. 12 is a side view representing a partial modification of Fig. 10 to include a mechanical operation of the brake.

Fig. 13 is a partial modification of the fluid or hydraulic brake operating means.

Figure 6:
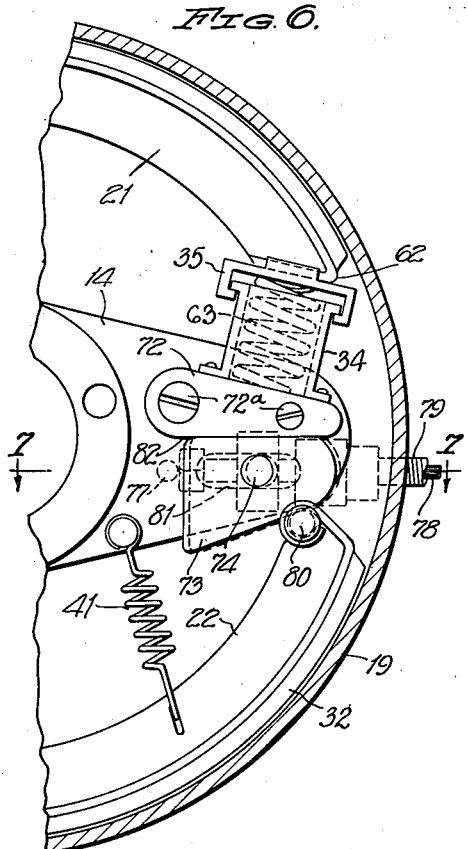
Fig. 6 is a side view of a portion of a modification.

Referring to the drawings and more particularly to Figs. 1 and 2, the bracket 14 is mounted integrally with a hub 15 having a boss 16 on one side and a flange 17 on the other side. The bracket is mounted on a shaft (not shown) which goes into the opening 18. The brake drum 19 has mounted on the inside thereof a brake shoe 20 which is in reality composed of two brake shoe segments 21 and 22 which are pivoted by having a notch 23 or female member that cooperates with a pivot 24.

A shoe cam 25 has two parts which are pivoted on the bracket 14 having a pin 26 with a notch 27 therein. The notch 27 may be turned to move the shoe cam which is composed of two parts 28 and 29. Each of the shoe cam portions being on opposite sides of the shoe pivot 24 and its female member notch 23, so that the pivot and its cooperating notch will not slip from their cooperative position. The shoe cam segments 28 and 29 operate together so that when the screw 26 is turned the shoe cam 25 will be moveable from a position shown dotted as 30 to the position shown slotted as 31.

This adjustment not only holds the shoe pivot in cooperative relation but also may be used to urge the shoe carrying the brake lining 32 against the brake drum 19 as a means of adjustment to centralize the brake shoe segments in relation to the drum.

A nut 33 is threadedly mounted on the screw 26 which nut acts as a locking means to hold the shoe cam 25 in a fixed position once it is adjusted. The housing 34 is fixedly mounted on the bracket 14 at the opposite end from the shoe cam mounting. The housing 34 has a clamp member 35 with flanges 36 which grip the shoulder 37 which shoulder is mounted on the housing 34. It will be noted that there is a space between the shoulder 37 and the face 38 of the clamp 35.

A spring such as 63 in Fig. 3 is in the housing 34 and tends to urge the face 38 of the clamp away from the shoulder 37. A bellows 40 has one end thereof mounted on the underneath side of the housing 34, which bellows expands and contracts depending on the fluid pressure which is forced therein against the action of the springs 41 which springs connect with slots 42 on the brake shoe segments and the bracket 14 tending to pull the brake shoe segments away from the drum. The brake shoe segment 21 is slidably mounted between the flanges 43 which flanges are an integral part of the clamp 35.

By referring to Fig. 3 which is an enlarged view of part of the construction shown in Fig. 1, taken in conjunction with Fig. 1, it will be seen that a rocker arm 44 has a threaded portion 45 into which an adjustment member 46 is threaded. A locking spring 47 is on the inside of the adjustment member 46 and tends to urge the adjustment member away from the rocker arm housing 48.

This locking spring tends to create friction on the threads of the adjustment member so that once the adjustment member is set by turning same by the application of a small tool or other means which fits in the holes 49, the adjustment member tends to remain in a fixed position. A rocker arm pivot 50 is attached to the back of the rocker arm which is movably mounted in an indenture 51 which indenture is in a valve 52 located in the bellows.

An indenture 53 on the front of the adjustment member engages a rounded portion 54 of the shoe segment 22. The rocker arm 44 is pivotally mounted on the bracket 14. A connecting lever 55 is connected by the pin 56 to any conventional mechanical operating means such as a brake rod. The connecting link has a camming member 57 securely connected thereto which moves in a slot 58 so that the movement of the connecting link 55 will cause the camming member 57 to urge the rocker arm 44 in a downward position.

The bellows 40 is threadedly connected into the housing 34 at 59. An aperture 60 is an entrance for the fluid which moves into the aperture 60, then into the passage 61 against the valve 52 which valve is moved from its seat by the pressure of the fluid, then moves into the bellows causing said bellows to expand when the fluid pressure is sufficient to cause operation thereof.

It will, therefore, be seen that when the fluid pressure is sufficient, the bellows will expand causing the valve 52 to press against the rocker arm pivot 50, moving the rocker arm 44 so that the adjustment member 46 engages the pivot 54 of the brake shoe segment 22. In operation the pressure on the segment 22 will also put pressure on the segment 21 causing the end of the brake shoe 21 to move along the clamp member 35, of the housing 34, so that the lining 22 will engage the brake drum.

Simultaneously therewith both of the brake shoe segments will be so urged that they will properly align themselves against the inner surface of the brake drum so that a continued pressure on the pivot 54 of the segment 22 will cause a relatively even distribution of the pressure so that the drum will be gripped relatively evenly.

The spring 63 and the housing 34 is strong enough to prevent the shoulder 37 from engaging the face 38 of the clamp 35 under normal conditions. However, under abnormal conditions of an extremely heavy pressure from the bellows the shoulder 37 will engage the face 38 of the clamp 35. The purpose of the spring 63 is to prevent the brakes from locking under normal conditions. It will be realized that the degree of tension of the spring will control the resiliency of the non-locking feature. The connecting link 55 may be operated individually as a purely mechanical brake to urge the rocker arm 44 against the pivot 54 of the segment 22.

While it is now shown herein, it is to be understood that the mechanical and the hydraulic features may be combined by any conventional method generally known to the man skilled in the art.

Fig. 4 is a somewhat enlarged view of the shoe cam 25 showing how the shoe cam engages the under surface of one of the two shoe segments to adjust the segment in relation to the brake drum. It is pointed out that the bracket 14 is not in the same plane with the shoe cam 25 as discussed relative to Fig. 2.

The view in Fig. 5 shows the fluid entrance tube 64 and the connecting link 55. The screw 26 which is the pivot for the shoe cam 25 is shown protruding through the two covering sections 65 and 69. Clamps 67 and 68 engage cover sections 65 and 69 respectively and have springs 66 therebetween to hold the cover in place. The connecting link 55 shown in Fig. 2 is connected to the camming member 57 by means of the shaft 70. The pin 71 goes into the shaft 70 to connect the camming member 57 thereto and prevent same from movement when the mechanical brake is applied.

Figure 7:
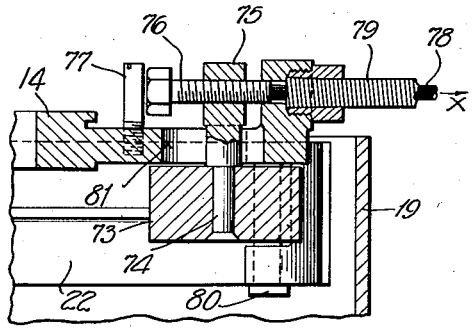
Fig. 7 is a top view taken on line 7—7 of Fig. 6.

Referring to Figs. 6 and 7 we note a modification for the mechanical application of the brakes. A plate mounting 72 is fixed by screws 72ª to the bracket 14. A camming member 73 is mounted on a stud 74 which stud is a unit for an extension 75 with an adjustment screw 76 through the head of which adjustment screw engages a stop pin 77 to restrict the rearward movement of said adjustment screw 76. A flexible cable 78 moves in a sheath 79 which cable is attached to the screw 76. A pin 80 is affixed to one end of the segment 22. The stud moves in a slot 81 in response to the movement of a flexible cable so that when the cable 78 is moved in the direction of the arrow X the stud and its camming member 73 will be urged against the pin 80 and will slide against said pin into the underneath surface 82 of the mounting 72. It will, therefore, be seen that by this simple mechanical method a camming surface will cause the brake to be applied by a movement of the segments 22 and 21 in conjunction with the mechanism provided at the brake shoe end 62, which mechansm has been previously explained.

Figure 8:
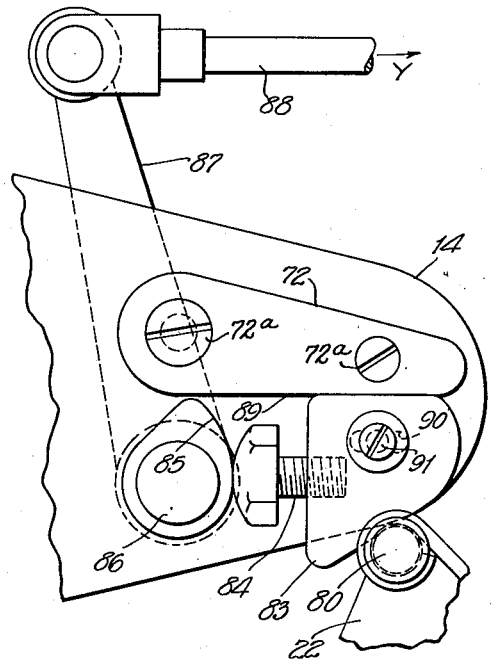
Fig. 8 is a side view of a modification of the means for mechanically applying braking force.
Figure 9:
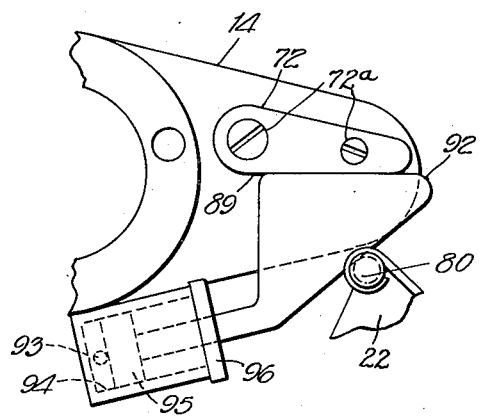
Fig. 9 is a modification of Fig. 8 showing a fluid means for applying braking force.

Fig. 8 has a mounting 72 similar to that in Fig. 6 which mounting has a camming member 83 which engages pin 80 which is affixed to the end of the segment 22. An adjustment stud 84 is threadedly mounted in the camming member 83 and engages a cam 85 which cam is connected through the stud 86 to the connectng link 87 and the brake rod 88. The face 89 of the mounting 72 will engage the top of the camming member 83 and permit said camming member to slide against said face. A slot 90 has a pin 91 which positions the camming member on the bracket 14. In this arrangement it will be seen that an application of force in the direction of the arrow Y will cause the cam 85 to impinge the head of the stud 84 so that the camming member 83 will engage the pin 80 and cause the brake segments to be operated toward the inner surface of the brake drum. A further modification is shown in Fig. 9 wherein the mounting 72 is fixed by pins 72ª to the bracket 14. A camming member 92 will operate on the underneath surface 89 of the mounting 72 and engage the pin 80 which is connected to the segment 22. An aperture for fluid 93 enters a chamber 94 which has a piston 95 therein, which chamber 94 is closed by a cap 96. When the fluid enters the chamber 94 the piston is moved away from the aperture 93 which causes the member 92 to operate against the face 89 of the mounting 72 and ride with its camming face against the pin 80 so that the segment 22 is moved to actuate the brake.

The showing in Figs. 10, 11 and 12 indicate a housing 97 with a fluid passage 98. The inside of the housing has a bellows 99 and an adjustment member similar to 46 which is connected to the housing 100. A rounded member 101 engages one side of the bellows while the rounded head of the stud 46 engages the opposing side of the bellows which member 46 is substantially stationary.

In operation when the fluid moves through the passage 98 intermediate the members 102 and 103 of the bellows the fluid pressure will cause the segment 22 to be forced away from the member 46 to cause application of the brake.

The view in Fig. 11 shows the part 101 which engages the diaphragm 103 of the bellows. The diaphragm may be of any resilient material such as rubber or flexible metal either of which may be used depending on the accomplishment desired in the particular construction.

Fig. 12 is somewhat similar to Fig. 10 using the underneath surface of the housing as a stop 104 which engages a face 105 on a rocker arm 106. The rocker arm 106 is attached to a connecting link 107 shown dotted.

In this case application on the brake rod in the direction Y will cause the rocker arm to move away from the camming face 104 of the housing 108 so that the adjustment member 109 which is similar in operation to 46 will cause the diaphragms 102 and 103 to engage each other so that direct mechanical pressure can be applied to the portion 101 connected to the segment 22. A stop pin or stud 110 is connected onto the bracket 14 to restrict the rearward movement of the connecting link 107. The view shown in Fig. 13 is a substitution for the bellows and is in fact a spherical rubber member 111 (also shown dotted, as when fully expanded and the parts 109 and 101 are sufficiently spaced one from the other) which has the parts 101 and 109 on opposing sides of the rubber ball 111. The rubber ball 111 may supplant the bellows 99 and will fit into any suitable housing which may in fact be similar to the housing 97 shown in Fig. 12.

From the foregoing it will be seen that the invention is a full floating brake which has resilient means to prevent locking under normal operation. The various operations indicate the flexibility of the invention and its general application which may be used in conjunction with any rotating parts such as wheels of automobiles or airplanes on which a nicety of adjustment will afford a non-locking brake to prevent airplanes in particular from skidding, which may result in the air plane tipping up on its nose and causing damage thereto.

While the present invention shows certain modifications which may be comprehended from a perusal of the present invention it is to be understood that various equivalent parts may be utilized to supplement those indicated herein.

In my co-pending application Serial No. 337,189, filed May 25, 1940, filed as a continuation in part of my present application, I have also disclosed the subject matter of the latter and it is in my said co-pending application that I have elected to claim generic subject matter common to the two applications and in addition to claim therein specifically species subject matter excepting the species disclosed in Figures 6, 7, 8 and 9, the latter species being claimed in my present application.

While specific details of the apparatus and system of operation is presented herewith the invention is not confined thereto as changes and alterations may be and may become apparent to those skilled in the art without departing from the spirit thereof as defined by the appended claims.

Having thus described the invention, which I claim as new and desire to secure by Letters Patent of the United States is:

1. In a full floating brake of the class described comprising a brake drum and a pair of complemental brake shoe segments within said brake drum, a bracket for supporting said brake shoe segments, a mounting fixedly connected to said bracket, means connecting said mounting to one end of one of said brake shoe segments, pin means forming a cam follower and mounted on one end of the other of said brake shoe segment, camming means intermediate said mounting and said pin means and having a cam contour coacting with said cam follower pin means and means for causing movement of said camming means to change the relationship between said cam contour and said cam follower pin means, thereby to operate said brake.

2. A brake construction comprising a brake drum having therein an expansible brake shoe, a part relative to which the brake drum is rotatable, said part carrying a support, a rest for one end of said brake shoe, means mounting said rest on said support for limited movement toward or away from said support and resilient means urging said rest in a direction generally opposed to the direction of thrust of said brake shoe end on said rest, and actuating means carried by said part for exerting a force on the other end of said brake shoe, said actuating means comprising a mechanical system including a movable cam member having means mounting it movably from said part, said last-mentioned mounting means comprising means for guiding said cam member when moved to change its camming effect in a direction toward said other end of said brake shoe, said other end of said brake shoe and said cam member having means interposed therebetween for converting the changing cam effect of said movable cam member into a thrust upon said other end of said brake shoe.

LOUIS AMBROSE.